(12) United States Patent
Tetsuka

(10) Patent No.: US 10,766,557 B2
(45) Date of Patent: Sep. 8, 2020

(54) SCREEN CONTROL DEVICE

(71) Applicant: HONDA MOTOR CO., LTD., Minato-ku, Tokyo (JP)

(72) Inventor: Takashi Tetsuka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 57 days.

(21) Appl. No.: 16/089,254

(22) PCT Filed: Feb. 22, 2017

(86) PCT No.: PCT/JP2017/006577
§ 371 (c)(1),
(2) Date: Sep. 27, 2018

(87) PCT Pub. No.: WO2017/169325
PCT Pub. Date: Oct. 5, 2017

(65) Prior Publication Data
US 2019/0106172 A1 Apr. 11, 2019

(30) Foreign Application Priority Data
Mar. 30, 2016 (JP) .................................. 2016-069439

(51) Int. Cl.
*B62J 17/04* (2006.01)
*E05F 15/695* (2015.01)
(Continued)

(52) U.S. Cl.
CPC .............. *B62J 17/04* (2013.01); *B60J 1/04* (2013.01); *B60J 1/17* (2013.01); *E05F 15/695* (2015.01); *B62K 11/14* (2013.01); *B62K 23/02* (2013.01)

(58) Field of Classification Search
CPC B62J 17/04; B62K 23/02; E02F 15/40; E02F 15/659; E02F 15/695; B60J 1/17;
(Continued)

(56) References Cited

U.S. PATENT DOCUMENTS 4,707,017 A * 11/1987 Minobe ..................... B62J 17/00
296/78.1
5,525,876 A * 6/1996 Filippi ..................... H02H 7/0851
318/282
(Continued)

FOREIGN PATENT DOCUMENTS

CN 101503102 A 8/2009
DE 19745597 A1 * 4/1999 ........... H02H 7/0851
(Continued)

OTHER PUBLICATIONS

EPO machine translation of DE 19745597 (original DE document published Apr. 8, 1999) (Year: 1999).*
(Continued)

*Primary Examiner* — Faris S Almatrahi
*Assistant Examiner* — David A Testardi
(74) *Attorney, Agent, or Firm* — Carrier Blackman & Associates, P.C.; Joseph P. Carrier; Jeffrey T. Gedeon

(57) ABSTRACT

Motor output setting means is provided which changes an output of a motor in accordance with a detection value of position detection means when a screen is driven in a downward direction. The motor output setting means changes the output of the motor in response to the screen reaching a first intermediate position and a second intermediate position between an uppermost position and a lowermost position of the screen. When the screen reaches the second intermediate position, the motor output setting means drives the motor by using a limited output obtained by adding a predetermined addable output to a minimum output for driving required for driving the screen in the downward direction. Such screen control device is aimed at optimization of motor output taking into consideration the catching (clamping) of foreign matter.

16 Claims, 8 Drawing Sheets

(51) Int. Cl.
  *B60J 1/04* (2006.01)
  *B60J 1/17* (2006.01)
  *B62K 11/14* (2006.01)
  *B62K 23/02* (2006.01)

(58) Field of Classification Search
  CPC .... B60J 7/0543; B60J 1/00; B60J 1/04; E05Y 2400/32; E05Y 2400/35; E05Y 2400/354; E05Y 2400/356; E05Y 2400/358; H02H 7/0851
  See application file for complete search history.

(56) References Cited

U.S. PATENT DOCUMENTS

| | | | | |
|---|---|---|---|---|
| 5,704,679 A * | 1/1998 | Sodo | ............... | B62J 17/04 296/78.1 |
| 5,734,245 A * | 3/1998 | Terashima | ......... | G05B 19/4061 318/453 |
| 6,114,822 A * | 9/2000 | Ubelein | ............... | B60J 7/0573 318/266 |
| 6,166,508 A * | 12/2000 | Kalb | ............... | E05F 15/70 318/286 |
| 6,194,855 B1 * | 2/2001 | Lochmahr | ............ | B60J 7/0573 318/283 |
| 6,236,176 B1 * | 5/2001 | Uebelein | ............ | H02H 7/0851 318/280 |
| 6,472,836 B1 * | 10/2002 | Uebelein | ............ | H02H 7/0851 318/434 |
| 6,560,088 B1 * | 5/2003 | Beck | ............... | F01L 9/04 251/129.01 |
| 6,630,808 B1 * | 10/2003 | Kliffken | ............ | G05B 13/042 318/266 |
| 7,281,750 B1 * | 10/2007 | Wise | ............... | B62J 17/04 280/288.4 |
| 8,123,273 B2 | 2/2012 | Tsuda et al. | | |
| 2002/0190679 A1 * | 12/2002 | Lamm | ............... | H02H 7/0855 318/443 |
| 2005/0184694 A1 * | 8/2005 | Kalb | ............... | H02H 7/0851 318/452 |
| 2005/0203690 A1 * | 9/2005 | Russ | ............... | E05F 15/40 701/49 |
| 2005/0275363 A1 * | 12/2005 | Honma | ............... | E05F 15/659 318/280 |
| 2007/0241704 A1 * | 10/2007 | Shimomura | ....... | G05B 19/0428 318/280 |
| 2008/0236922 A1 * | 10/2008 | Tsuda | ............... | B60R 25/24 180/167 |
| 2009/0007493 A1 * | 1/2009 | Hohn | ............... | B60J 7/0573 49/349 |
| 2009/0021190 A1 * | 1/2009 | Shibata | ............... | E05F 15/695 318/14 |
| 2009/0295556 A1 * | 12/2009 | Inoue | ............... | E05F 15/695 340/438 |
| 2009/0299580 A1 * | 12/2009 | Sakai | ............... | E05F 15/695 701/49 |
| 2016/0052373 A1 * | 2/2016 | Hoshi | ............... | B60J 1/04 701/49 |

FOREIGN PATENT DOCUMENTS

| | | | | |
|---|---|---|---|---|
| JP | 08189272 A | * | 7/1996 | |
| JP | 10002150 A | * | 1/1998 | |
| JP | 2004116051 A | * | 4/2004 | |
| JP | 2007-037278 A | | 2/2007 | |
| JP | 2008-069571 A | | 3/2008 | |
| JP | 2008069571 A | * | 3/2008 | .......... H02H 7/0851 |
| JP | 2009-024423 A | | 2/2009 | |
| JP | 2010-149686 A | | 7/2010 | |

OTHER PUBLICATIONS

PCT/ISA/210 from International Application PCT/JP2017/006577 and the English translation thereof, (May 16, 2017).
Taiwanese Office Action issued in the corresponding Patent Application 10621300180.
Taiwanese Office Action issued in the corresponding Patent Application 106109318.

\* cited by examiner

SCREEN CONTROL DEVICE

TECHNICAL FIELD

The present invention relates to a screen control device, particularly to a screen control device for adjusting the height of a screen attached to a vehicle body.

BACKGROUND ART

Conventionally, in relation to a screen for preventing airflow associated with a motorcycle from impinging the body, there has been known a configuration in which the height of the screen can be arbitrarily adjusted by operating a switch provided, for example, in the vicinity of a handlebar. Such an electrically driven screen device is generally configured in such a manner that the screen is moved upward and downward by pulling a wire connected to the screen by an electric motor.

Patent Document 1 discloses an electrically driven screen device with a configuration in which when smooth movement of the screen becomes difficult due to catching (nipping) of foreign matter or the like, motor output is stopped in accordance with a detection temperature of a thermistor incorporated in a driving circuit for the electric motor.

PRIOR ART DOCUMENT

Patent Document

Patent Document 1: JP 2007-037278 A

SUMMARY OF INVENTION

Problem to be Solved by Invention

However, the technology of Patent Document 1 is aimed at prevention of breakage of a wiring driving device or the electric motor, and further optimization of the motor output has not been investigated therein.

It is an object of the present invention to provide a screen control device aimed at solving the above-mentioned problem in the related art and at optimization of motor output taking into consideration the catching (clamping) of foreign matter.

Means for Solving Problems

To achieve the afore-mentioned purpose, the present invention has a first feature in that a screen control device (50) comprising: a screen (7) that is disposed at a front portion of a vehicle (1) and that shields airflow; a motor (37) that moves the screen (7) upward and downward along a guide (39); position detection means (57) that detects a position of the screen (7); and output detection means (53) that detects an output of the motor (37), wherein the screen control device further includes motor output setting means (51) that changes the output of the motor (37) in accordance with a detection value of the position detection means (57) when the screen (7) is driven in a downward direction.

The present invention has a second feature in that the motor output setting means (51) changes the output of the motor (37) in response to the screen (7) reaching a predetermined intermediate position (S1, S2) between an uppermost position (UP) and a lowermost position (LO) of the screen (7).

The present invention has a third feature in that further comprising: storage means (54) that stores a minimum output for driving (MIN) that is required for driving the screen (7) in the downward direction, wherein the predetermined intermediate position (S1, S2) includes a first intermediate position (S1) and a second intermediate position (S2) below the first intermediate position (S1), and the motor output setting means (51) drives the motor (37) by a limited output (LIM), which is obtained by adding a predetermined addable output (A) to the driving minimum output (MIN), upon the screen (7) reaching the second intermediate position (S2).

The present invention has a fourth feature in that the motor output setting means (51) stores into the storage means (54) the driving minimum output (MIN) that is detected for the first time after starting of an engine of the vehicle (1).

The present invention has a fifth feature in that the motor output setting means (51) detects the driving minimum output (MIN) and stores it into the storage means (54) each time the screen (7) is driven in the downward direction.

The present invention has a sixth feature in that the addable output (A) is lower than the driving minimum output (MIN).

The present invention has a seventh feature in that the motor output setting means (51), when the screen (7) is continuously driven downward from the uppermost position (UP) to the lowermost position (LO), linearly increases the motor output until the motor output reaches a predetermined upper limit output, holds the upper limit output upon the motor output reaching the upper limit output, starts a control of linearly decreasing the motor output upon the screen (7) reaching the first intermediate position (S1), and drives the screen (7) to the lowermost position (LO) by holding the limited output (LIM) upon the screen (7) reaching the second intermediate position (S2).

Advantageous Effects of Invention

According to the first feature, the screen control device further includes motor output setting means (51) that changes the output of the motor (37) in accordance with a detection value of the position detection means (57) when the screen (7) is driven in a downward direction. For example, with the motor output decreased upon the screen approaching the lowermost position where catching (clamping) of foreign matter or the like may occur, it is ensured that even if foreign matter or the like should be caught (clamped), clamping with a strong force can be prevented.

According to the second feature, the motor output setting means (51) changes the output of the motor (37) in response to the screen (7) reaching a predetermined intermediate position (S1, S2) between an uppermost position (UP) and a lowermost position (LO) of the screen (7). With the motor output adjusted stepwise at intermediate positions, a shortening of the lowering time for the screen and a natural driving mode can both be realized.

According to the third feature, the screen control device further comprises: storage means (54) that stores a minimum output for driving (MIN) that is required for driving the screen (7) in the downward direction, wherein the predetermined intermediate position (S1, S2) includes a first intermediate position (S1) and a second intermediate position (S2) below the first intermediate position (S1), and the motor output setting means (51) drives the motor (37) by a limited output (LIM), which is obtained by adding a predetermined addable output (A) to the driving minimum output (MIN), upon the screen (7) reaching the second intermediate position (S2). Even in the case where a higher motor output is required for lowering the screen due to, for example, wear or secular change of component parts, the screen driving force (clamping force) when the screen is approaching the lowermost position can be kept constant.

According to the forth feature, the motor output setting means (51) stores into the storage means (54) the driving minimum output (MIN) that is detected for the first time after starting of an engine of the vehicle (1). It is possible to perform a process in which when the lowering operation of the screen is not conducted after starting of the engine, the processing of detecting the driving minimum output is not carried out, but the driving minimum output detected when the first lowering operation is conducted is stored, and, thereafter, the screen is driven by using the stored driving minimum output until the engine is stopped. As a result, a screen control taking into account the wear or secular change of component parts can be performed, the processing of detecting and storing the driving minimum output can be minimized, and burden of control can be reduced. Accordingly, it is possible to cope with variability in structure of the screen driving device.

According to the fifth feature, the motor output setting means (51) detects the driving minimum output (MIN) and stores it into the storage means (54) each time the screen (7) is driven in the downward direction. A screen control in conformity with a newest screen state can always be performed. As a result, it is possible to cope with variability in structure of the screen driving device.

According to the sixth feature, the addable output (A) is lower than the driving minimum output (MIN). The limited output can be set to such a level that even if foreign matter or the like is caught (clamped), it can be pulled out swiftly.

According to the seventh feature, the motor output setting means (51), when the screen (7) is continuously driven downward from the uppermost position (UP) to the lowermost position (LO), linearly increases the motor output until the motor output reaches a predetermined upper limit output, holds the upper limit output upon the motor output reaching the upper limit output, starts a control of linearly decreasing the motor output upon the screen (7) reaching the first intermediate position (S1), and drives the screen (7) to the lowermost position (LO) by holding the limited output (LIM) upon the screen (7) reaching the second intermediate position (S2). A shortening of the lowering time for the screen and a natural driving mode can both be realized.

DESCRIPTION OF EMBODIMENTS

Figure 1:
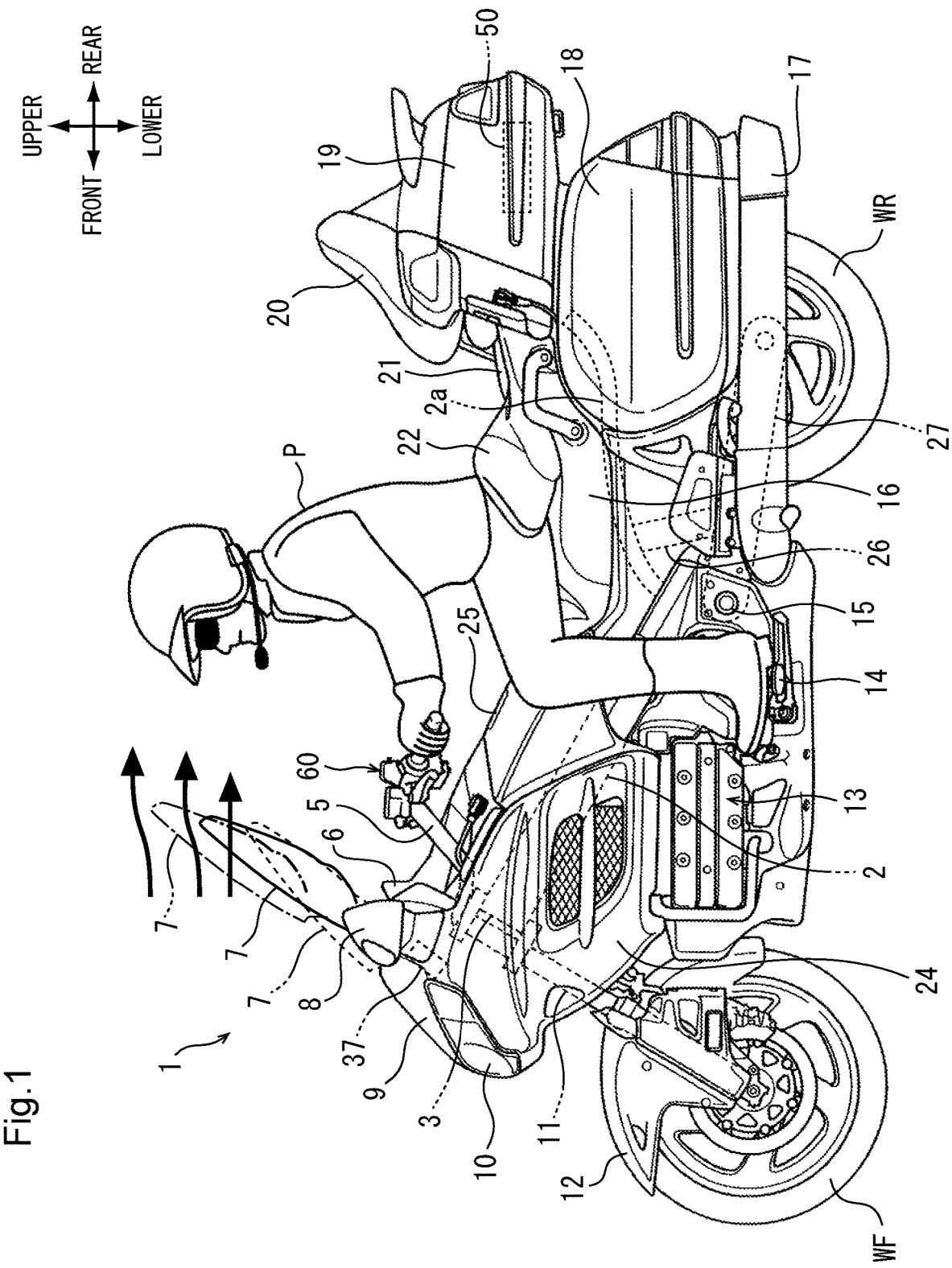
FIG. 1 is a left side view of a motorcycle to which a screen control device according to one embodiment of the present invention has been applied.

A preferred embodiment of the present invention will be described in detail below, referring to the drawings. FIG. 1 is a left side view of a motorcycle 1 to which a screen control device according to one embodiment of the present invention has been applied. The motorcycle 1 as a saddled vehicle is a long-distance running vehicle which has a horizontal opposed six-cylinder large-type engine as a drive source and which includes a large-type cowling and a plurality of accommodation cases.

A head pipe 3 that rotatably supports a steering stem (not shown) is provided at a front portion of a body frame 2. A pair of left and right front forks 11 that rotatably support a front wheel WF are fixed to the steering stem and supported in a steerable manner. A steering handlebar 5 is attached to upper ends of the front forks 11, and a front fender 12 that covers an upper portion of the front wheel WF is attached to substantially central portions of the front forks 11.

An engine 13 is suspended from and fixed to lower portions of a pair of left and right main tubes extending from the head pipe 3 toward a vehicle body rear lower side. A pivot 15 that supports a swing arm 27 in a swingable manner is provided on the rear side of the engine 13 and at rear ends of the main tubes. A rear frame 2a that extends from the upper side of the pivot 15 toward a rear upper side and supports a seat 16, a pair of left and right pannier cases 18 and the like is provided at a rear end of the body frame 2. Steps 14 on which to place the feet of a driver P are attached, as a left-right pair, on front lower sides of the pivot 15.

The swing arm 27 that supports a rear wheel WR as a driving wheel in a rotatable manner is suspended from a vehicle body by a rear cushion 26 connected to the rear frame 2a. A driving force of the engine 13 is transmitted to the rear wheel WR through a drive shaft (not shown) penetrating the swing arm 27, and a combustion gas from the engine 13 is exhausted from rear ends of a pair of left and right mufflers 17.

The pannier cases 18 as accommodation boxes are attached, as a left-right pair, on the upper side of the mufflers 17. The seat 16 is provided with a hip guard 22 for the driver P seated on the front side and a seating portion 21 for a passenger, and a backrest 20 for the passenger is provided at a front surface portion of a top case 19 as an accommodation box disposed in the center in regard of the transverse direction.

The front side of the head pipe 3 is covered with a front cowl 9 having a headlight 10. A pair of left and right side cowls 24 covering the body frame 2 and an upper portion of the engine 13 are connected to a rear portion of the front cowl 9. Rear view mirrors 8 of a winker device integrated type are attached, as a left-right pair, at positions on the front side of the steering handlebar 5 and on the transversely outer sides of the front cowl 9. A fill lid 25 of a fuel tank is provided between the seat 16 and the steering handlebar 5.

A screen 7 of which the position in the height direction can be adjusted by a motor 37 is disposed at a position between the left and right rear view mirrors 8 and on the front side of the driver P. A meter panel 6 is provided in the center in regard of the transverse direction on the immediately rear side of the screen 7. A left-side handlebar switch 60 having a plurality of operating switches is disposed on the transversely left side of the steering handlebar 5.

Control means (screen control device) 50 that performs fuel injection control and ignition control for the engine 13 and drive control for the screen 7 is accommodated inside the top case 19 at the vehicle body rear portion. The position in the direction of the screen 7 can be adjusted by a screen height adjustment switch (see FIG. 4) provided in the left-side handlebar switch 60, whereby the degree of impingement of airflow against the upper half of the body of the driver P can mainly be varied. The driver P can freely perform an adjustment to set the screen 7 to a low position, thereby feeling the airflow in a positive manner, or to set the screen 7 to a high position, thereby shielding the rain and airflow, during running of the vehicle.

Figure 2:
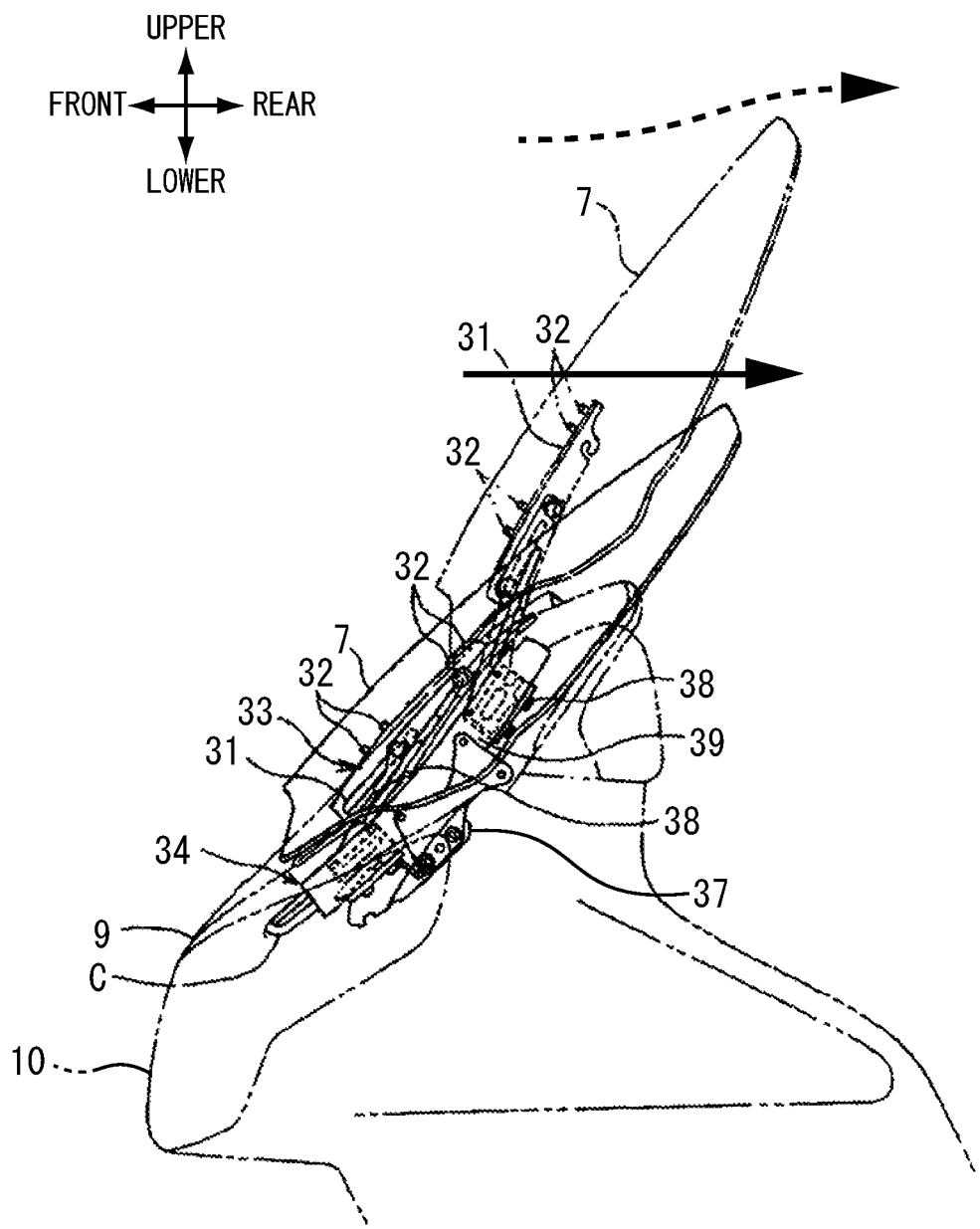
FIG. 2 is a partially enlarged view of the surroundings of the screen.

FIG. 2 is a partially enlarged view of the surroundings of the screen 7. A driving device 34 for moving the screen 7 vertically includes guide sections 39 that are attached to the front cowl 9 and extend in the vertical direction, and the motor 37 as a drive source for sliding the screen 7 along the guide sections 39.

Movable sections 38 slidably supported on the guide sections 39 and the motor 37 are connected by a push cable (push-pull cable) C. The movable sections 38 are moved in the vertical direction while being guided by the guide sections 39 in accordance with the driving of the motor 37. The screen 7, formed from a colorless transparent rigid resin, is attached by support sections 32 to attachment members 31 connected to the movable sections 38 through a sliding mechanism.

This configuration enables the screen 7 to be continuously adjusted in position from a lowermost position indicated by solid line to an uppermost position indicated by alternate long and two short dashes line, with its inclination angle being gradually changed. The angle of the screen 7 is set such that the inclination angle is the largest when the screen 7 is set at the lowermost position, and the inclination angle is slightest when the screen 7 is set at the uppermost position, whereby a windshielding effect in such an extent that airflow hardly impinges on a helmet of the driver P is exhibited.

Figure 3:
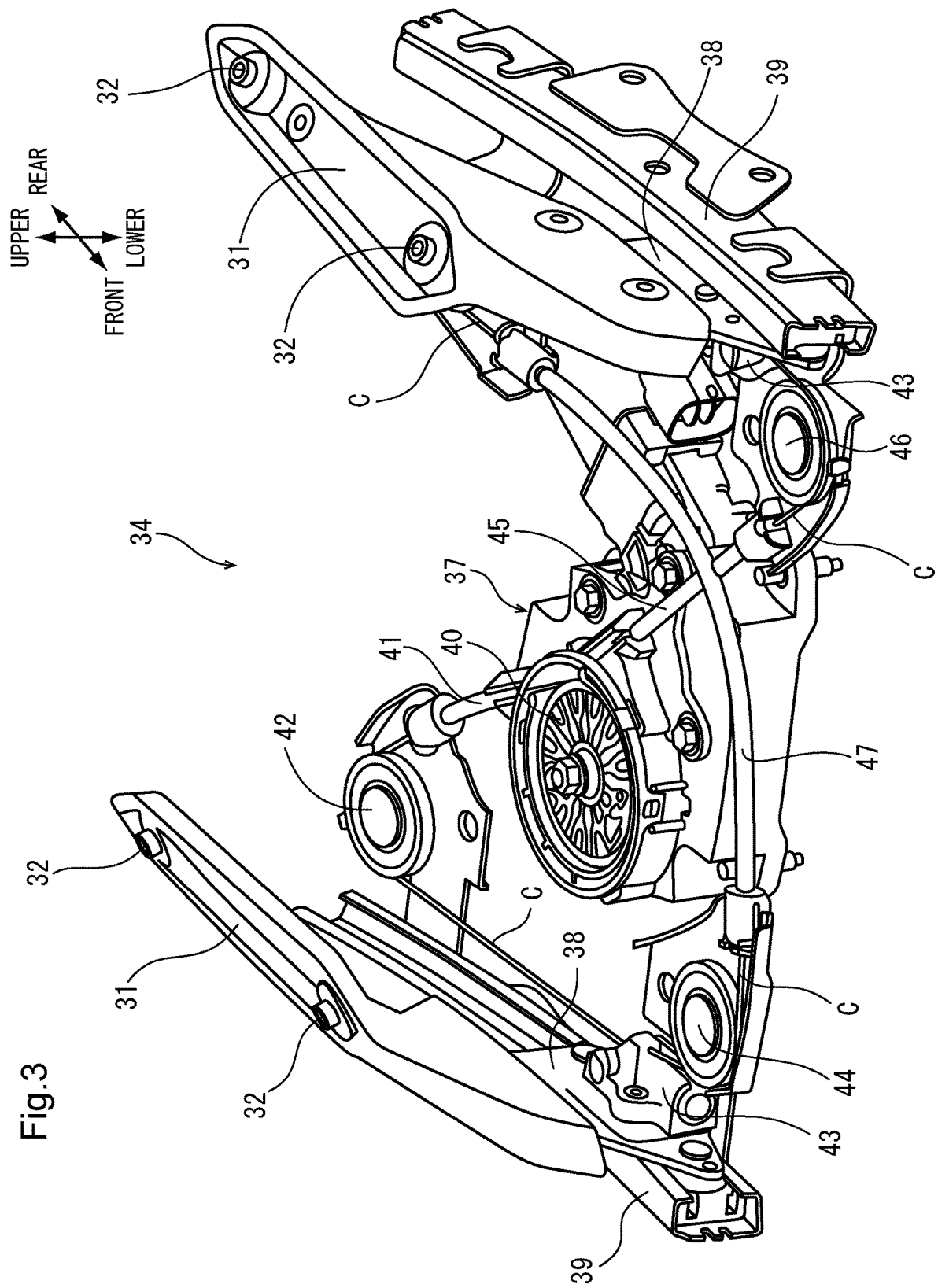
FIG. 3 is a perspective view of the driving device for the screen

FIG. 3 is a perspective view of the driving device 34 for the screen 7. The motor 37 rotationally drives a main pulley 40 around which the push cable C is wound. The movable sections 38 moved vertically while being guided by the guide sections 39 are provided with cable holders 43, to front and rear portions of which the push cable C is connected. The push cable C connected to a rear portion of the cable holder 43 on the transversely right side undergoes a directional change at a pulley 42 on the right rear side, is passed through a cable guide 41, and is wound around the main pulley 40.

On the other hand, the push cable C connected to a front portion of the cable holder 43 on the transversely right side undergoes a directional change at a pulley 44 on the right front side, is passed through a cable guide 47, and is led to a left rear upper side. The push cable C passed through the cable guide 47 undergoes a directional change at a pulley (not shown) disposed on the left rear side to be directed forward, and is connected to a rear portion of the cable holder 43 on the transversely left side. Besides, the push cable C connected to a front portion of the cable holder 43 on the transversely left side undergoes a directional change at a pulley 46 on the left front side, is passed through a cable guide 45, and is wound around the main pulley 40.

As a result, when the main pulley 40 is rotated clockwise in the figure, the screen 7 is raised, and when the main pulley 40 is rotated counterclockwise, the screen 7 is lowered. According to this driving device 34, when the cable holder 43 is raised, it is pulled by the push cable C connected to the rear side thereof and is pushed by the push cable C connected to the front side thereof, so that a highly accurate screen driving can be performed.

Figure 4:
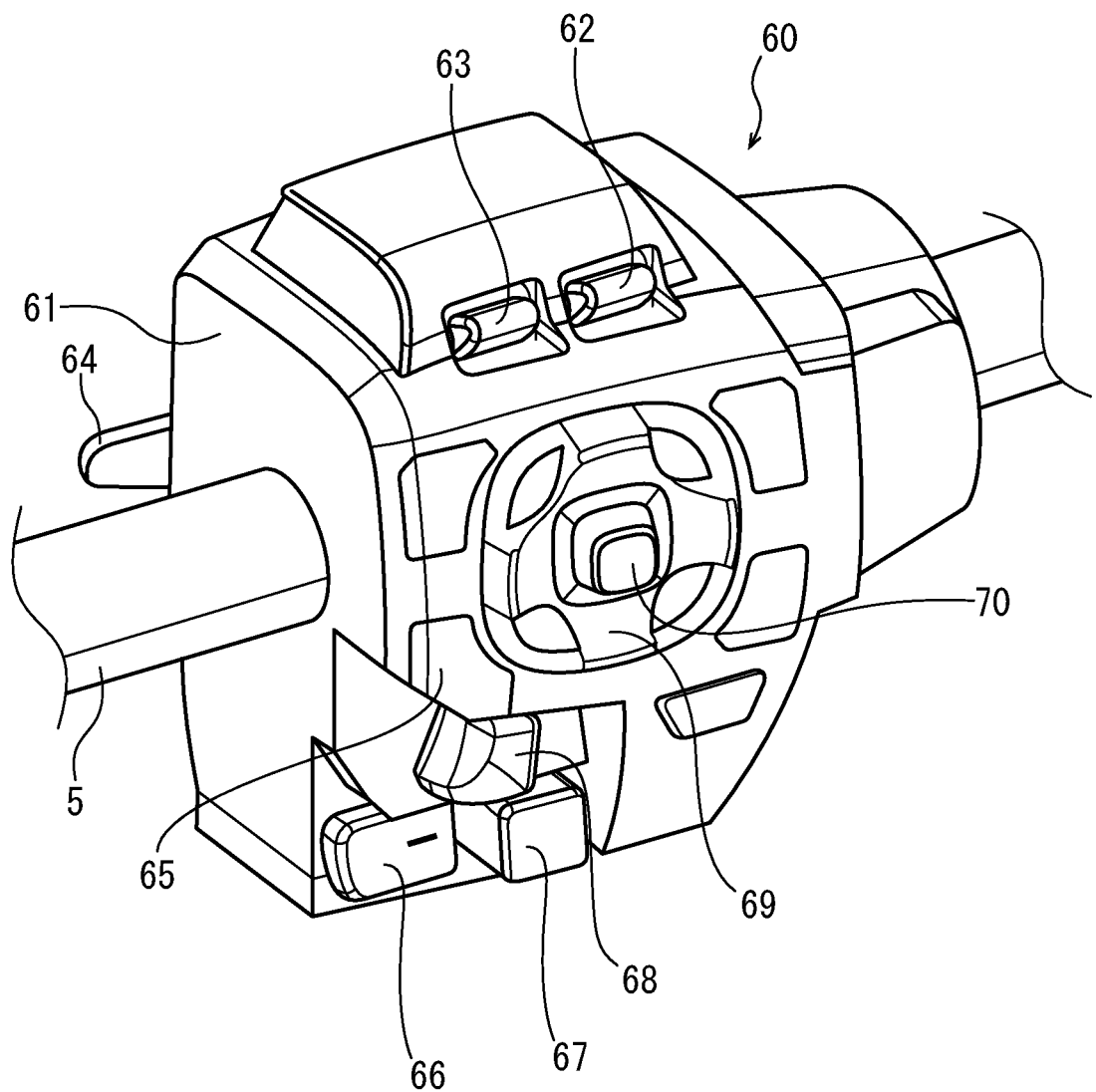
FIG. 4 is a perspective view of the left-side handlebar switch.

FIG. 4 is a perspective view of the left-side handlebar switch 60. On a housing 61 of the left-side handlebar switch 60, there are provided a cross button 69 and a determination button 70 to be used for operating a navigation system or the like, a volume switch 62, a screen height adjustment switch 63, a horn switch 65, a winker switch 68, a mode selector switch 67, and a shift-up switch 64 and a shift-down switch 66 as shifting means for a shifting operation (to instruct a shift) of a transmission.

The screen height adjustment switch 63 is a lever type switch which is swung vertically. The screen height adjustment switch 63 can be configured in such a manner that when it is operated with a force of not more than a predetermined value, a driving signal is outputted only during when it is operated, and, when it is operated with a force of more than the predetermined force, a driving signal is continuously outputted, until the screen 7 reaches the uppermost position or the lowermost position, even if a finger is thereafter put off the switch.

The horn switch 65, of a pressing type, is disposed at substantially the same height as the steering handlebar 5. The volume switch 62 and the screen height adjustment switch 63, both of a vertical swing type, are disposed side by side at positions on the upper side of the cross button 69. In addition, the winker switch 68, for operating turn signal lamps by being tilted to the left or right side, is disposed at a somewhat recessed portion under the horn switch 65.

The shift-up switch 64, disposed on the vehicle body front side of the housing 61, is disposed at substantially the same height as the handlebar 5. The shift-down switch 66, disposed at a lower end portion on the vehicle body rear side of the housing 61, is disposed at a further recessed portion under the winker switch 68. The mode selector switch 67, for changing over an ON/OFF state by projecting or recessing an operating element, is disposed at the right of the shift-down switch 66. An operating surface of the mode selector switch 67 is set at a position on the driver's side (vehicle body rear side) relative to the shift-down switch 66 and on the depth side (vehicle body front side) relative to the winker switch 68, whereby it is ensured that when operating each switch, the thumb would hardly touch the other switches.

Figure 5:
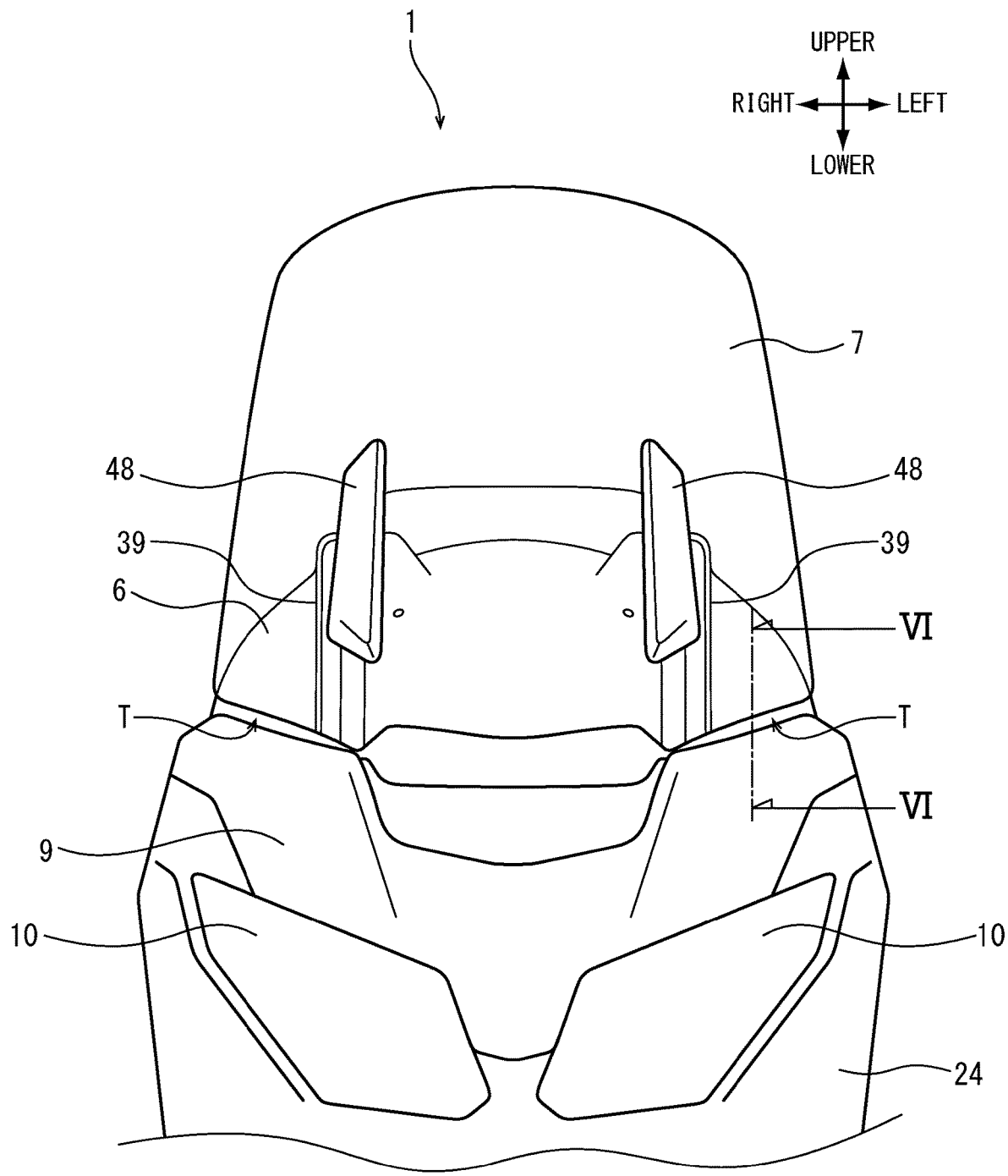
FIG. 5 is an enlarged front view of the motorcycle.
Figure 6:
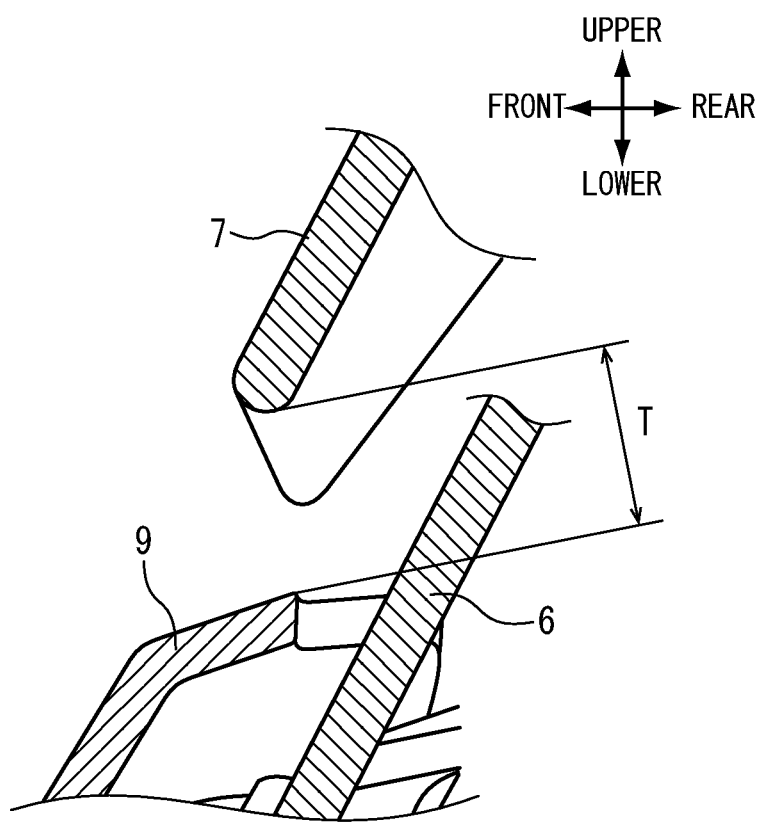
FIG. 6 is a sectional view taken along line VI-VI of FIG. 5.

FIG. 5 is an enlarged front view of the motorcycle 1. In addition, FIG. 6 is a sectional view taken along line VI-VI of FIG. 5. On the front side of the screen 7, there are disposed decorative members 48 which are connected to the attachment members 31 (see FIG. 3), with the screen 7 interposed therebetween. The screen 7 at the lowermost position is so set that it has an inclination angle for lying along an inclined surface of the front cowl 9 and that a gap between the screen 7 and the front cowl 9 is reduced, for reducing airflow disturbance and air resistance.

In the present embodiment, as shown in FIG. 5, at the lowermost position of the screen 7, small ranges on the lower side of the decorative members 48 are located proximate to the front cowl 9, and gaps T are formed on the transversely outer sides of the proximate portions. According to the setting of the gaps T, it is considered that on the transversely outer sides of the proximate portions, foreign matter or the like smaller in size than the gap T would not be caught (clamped) between the front cowl 9 and the screen 7, but foreign matter or the like larger in size than the gap T may be caught (clamped) between the front cowl 9 and the screen 7.

Figure 7:
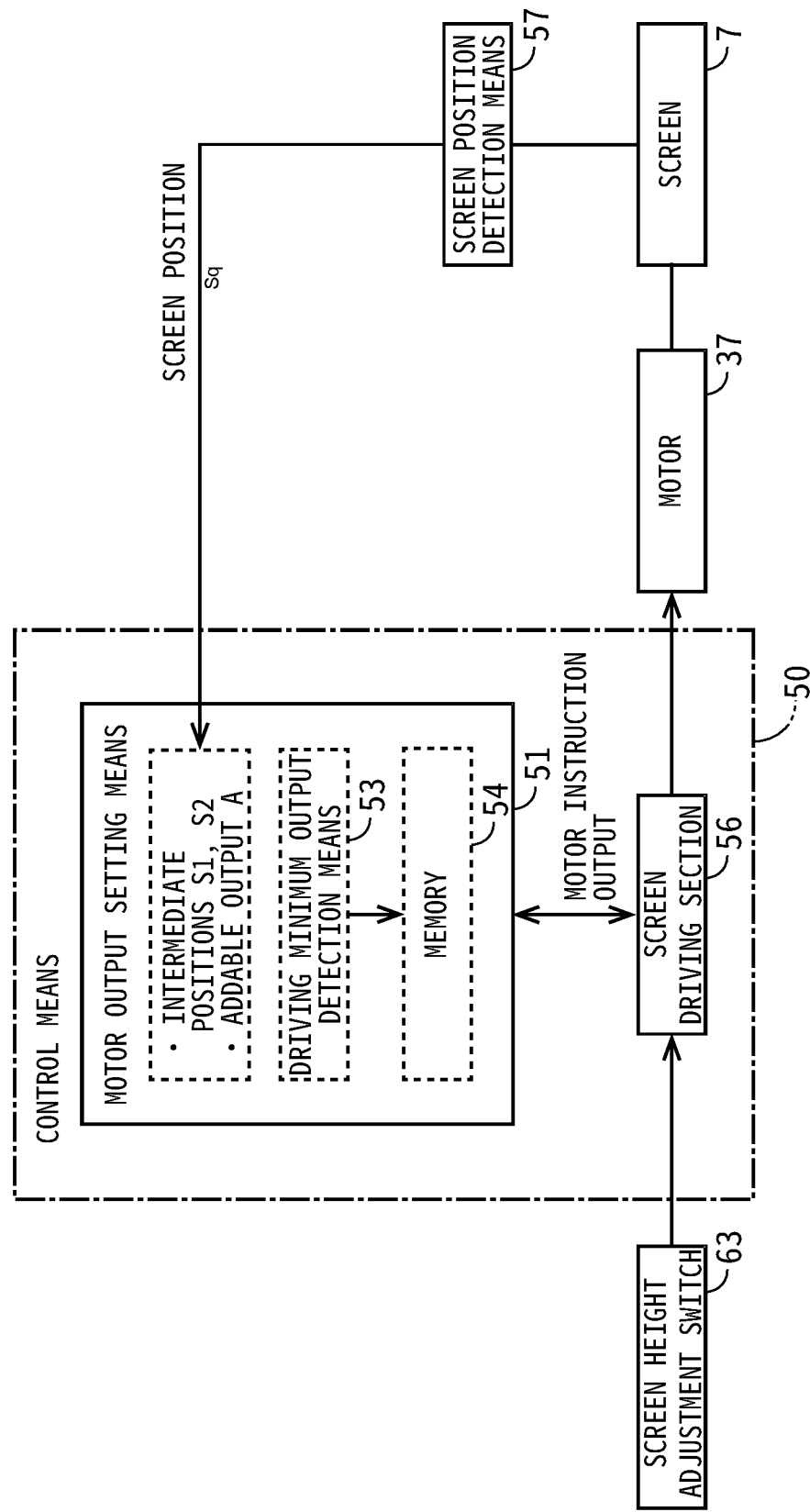
FIG. 7 is a block diagram showing the configurations of the screen control device and peripheral apparatuses.

FIG. 7 is a block diagram showing the configurations of the screen control device (control device) 50 and peripheral apparatuses. The control device 50, in drive control at the time of lowering the screen 7, decreases the output of the motor 37 when the screen 7 approaches the lowermost position where foreign matter or the like may be caught (clamped), whereby the motor output can be set to an optimum value for ensuring that even if foreign matter or the like should be caught (clamped), clamping with a strong force is prevented.

The control device 50 includes motor output setting means 51 (also referred to as a motor output setting unit 51) and a screen driving section 56. The motor output setting means 51 stores intermediate positions S1 and S2 and an addable output A; in addition, the motor output setting means 51 includes driving minimum output detection means 53 and a memory 54 as storage means (also referred to as a storage unit 54). The driving minimum output detection means 53 (also referred to as a driving minimum output detection unit 53) detects a minimum output for driving MIN required for moving the screen 7 in the downward direction, based on a motor instruction output given to the screen driving section 56 and output information from position detection means 57 (also referred to as a position detection unit 57). The memory 54 stores the minimum output MIN detected by the driving minimum output detection means 53, at an arbitrary timing. The position detection means 57 detects the height of the screen 7, based on an output pulse from a pulser rotor interlocked with the rotation of the motor 37, and transmits the height to the motor output setting means 51.

Detecting and storing processing of the driving minimum output MIN by the motor output setting means 51 can be performed for the driving minimum output MIN detected for the first time after starting of the engine of the motorcycle 1. In this case, it is possible to perform a process in which when the lowering operation of the screen 7 is not conducted after the starting of the engine, the detection of the driving minimum output MIN is not performed, but the driving minimum output MIN detected when the first lowering operation is conducted is stored, and, thereafter, the screen 7 is driven by using the stored driving minimum output MIN until the engine is stopped. As a result, a screen control taking into account the wear or secular change of component parts can be performed, the processing of detecting and storing the driving minimum output MIN can be minimized, and burden of control can be reduced.

In addition, the detecting and storing processing of the driving minimum output MIN may be carried out each time the screen 7 is driven in the downward direction. In this case, a screen control in conformity with a newest screen state can always be performed. As a result, it is possible to cope with variability in structure of the screen driving device.

Figure 8:
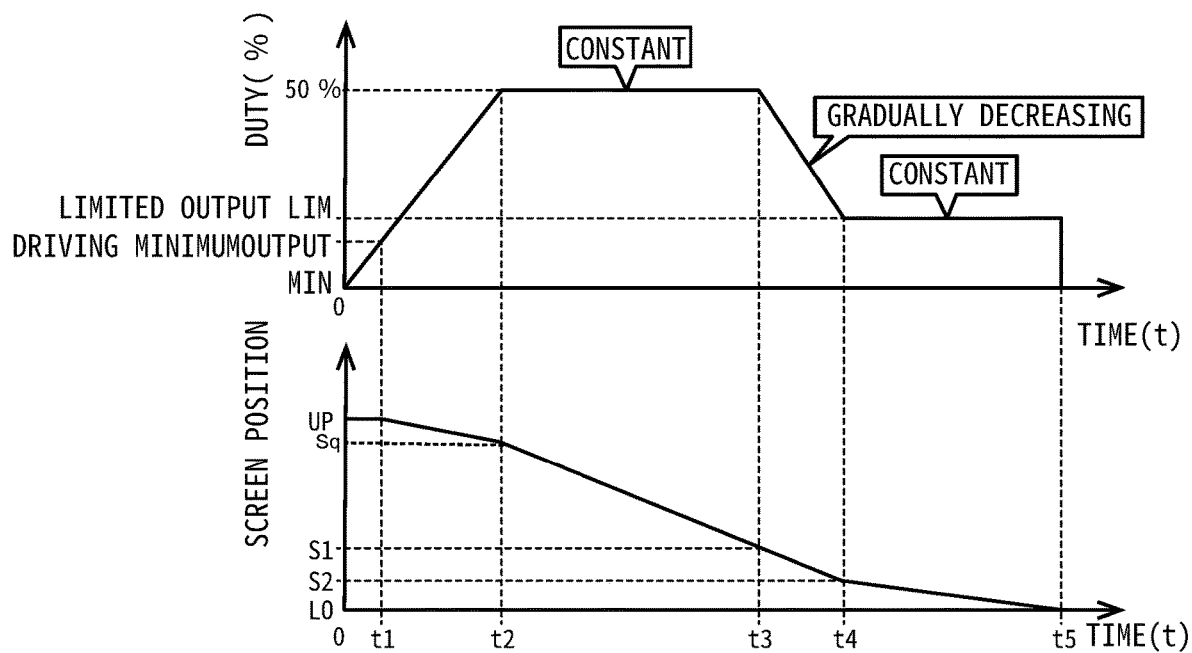
FIG. 8 is a graph showing a control mode at the time of driving the screen from the uppermost position to the lowermost position.
Figure 9:
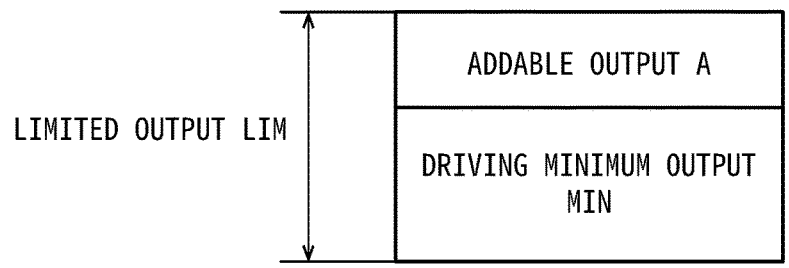
FIG. 9 is a schematic drawing showing the configuration of the limited output LIM.

FIG. 8 is a graph showing a control mode at the time of driving the screen 7 from the uppermost position UP (UPPER) to the lowermost position LO (LOWER). In addition, FIG. 9 is a schematic drawing showing the configuration of the limited output LIM. When the screen height adjustment switch 63 is operated in the downward direction at time t=0, motor duty (motor output) starts increasing linearly. At time t1, the screen 7 which has not been moved due to sliding resistance of the driving device 34 or the like starts to be lowered. The driving minimum output detection means 53 shown in FIG. 7 detects this motor duty at time t1 as the minimum output MIN, and stores it into the memory 54.

The motor duty continues increasing linearly also after time t1, and, at time t2, in response to the motor duty reaching a predetermined upper limit output (for example, 50%), starts holding the upper limit output. The position of the screen 7 at time t2 is a position Sq slightly lower than the upper limit position UP.

Next, at time t3, in response to the screen 7 reaching the first intermediate position 51 (for example, a height of 25 millimeters from the lowermost position) which is a predetermined intermediate position, a control of decreasing the motor output linearly is started. Then, at time t4, in response to the screen 7 reaching the second intermediate position S2 (for example, a height of 15 mm from the lowermost position) lower than the first intermediate position S1, a control of holding the motor output at the limited output LIM is started.

The second intermediate position S2 can be set to an arbitrary value at which catching (clamping) of foreign matter or the like between the screen 7 and the front cowl 9 is assumed to occur. In addition, the first intermediate position S1 can be arbitrarily set to a value slightly higher than the second intermediate position S2.

The limited output LIM applied during the period from time t4 to time t5 is an output obtained by adding a predetermined addable output A to the driving minimum output MIN. The setting of the addable output A can be conducted, for example, in the manner of setting the limited output LIM to such an output that even if foreign matter or the like is caught (clamped), it is not clamped with a strong force and can therefore be pulled out swiftly. The addable output A according to the present embodiment is a value lower than the driving minimum output MIN.

As above-mentioned, in the screen control device according to the present invention, the motor output setting means 51 that changes the output of the motor 37 according to the detection value of the position detection means 57 when the screen 7 is driven in the downward direction is provided, and the motor output setting means 51 changes the output of the motor 37 in response to the screen 7 reaching the first intermediate position S1 and the second intermediate position S2 between the uppermost position UP and the lowermost position LO of the screen 7. For example, with the motor output decreased when the screen 7 approaches the lowermost position where catching (clamping) of foreign matter or the like may occur, it is ensured that even if foreign matter or the like should be caught (clamped), clamping with a strong force can be prevented. In addition, with the motor output adjusted stepwise at intermediate positions, a shortening of the lowering time for the screen 7 and a natural driving mode can both be realized.

Further, the motor output setting means 51 drives the motor 37 by use of the limited output LIM, which is obtained by adding the predetermined addable output A to the driving minimum output MIN, upon the screen 7 reaching the second intermediate position S2. Therefore, even in the case where, for example, a higher motor output is required for lowering the screen 7 due to wear or secular change of component parts, the screen driving force (clamping force) when the screen 7 is approaching the lowermost position can be kept constant.

Note that the structure of the driving device for the screen, the set values of the predetermined intermediate positions, the set value of the addable output A, etc. are not limited to those in the above embodiment, and can be modified variously. The screen control device according to the present invention is applicable not only to the motorcycle but also to other various saddled vehicles such as three-wheeled or four-wheeled vehicles.

EXPLANATIONS OF NUMERALS

1 . . . Motorcycle
2 . . . Screen
37 . . . Motor
50 . . . Control means (Screen control means)
56 . . . Screen driving section
57 . . . Screen position detection means
60 . . . Left-side handlebar switch
63 . . . Screen height adjustment switch
A . . . Addable output
S1 . . . First intermediate position
S2 . . . Second intermediate position
MIN . . . Driving minimum output
LIM . . . Limited output
UP . . . Uppermost position
LOW . . . Lowermost position

What is claimed is:

1. A screen control device comprising:
a screen that is disposed at a front portion of a vehicle and that shields airflow;
a motor that moves the screen upward and downward along a guide;
a position detection unit that detects a position of the screen; and
an output detection unit that detects an output of the motor,
wherein the screen control device further includes a motor output setting unit that changes the output of the motor in accordance with a detection value of the position detection unit when the screen is driven in a downward direction, and
wherein the motor output setting unit changes the output of the motor in response to the screen reaching one of a number of predetermined intermediate positions between an uppermost position and a lowermost position of the screen, and
further comprising:
storage unit that stores a minimum output for driving that is required for driving the screen in the downward direction,
wherein the number of intermediate positions includes a first intermediate position and a second intermediate position below the first intermediate position, and
the motor output setting unit drives the motor by a limited output, which is obtained by adding a predetermined addable output to the driving minimum output, upon the screen reaching the second intermediate position.

2. The screen control device according to claim 1, wherein the motor output setting unit stores into the storage unit the driving minimum output that is detected when a first lowering operation of the screen is conducted after starting of an engine of the vehicle.

3. The screen control device according to claim 2, wherein the motor output setting unit detects the driving minimum output and stores it into the storage unit each time the screen is driven in the downward direction.

4. The screen control device according to claim 3, wherein the addable output is lower than the driving minimum output.

5. The screen control device according to claim 4, wherein the motor output setting unit,
when the screen is continuously driven downward from the uppermost position to the lowermost position,
linearly increases the motor output until the motor output reaches a predetermined upper limit output,
holds the upper limit output upon the motor output reaching the upper limit output,
starts a control of linearly decreasing the motor output upon the screen reaching the first intermediate position, and
drives the screen to the lowermost position by holding the limited output upon the screen reaching the second intermediate position.

6. The screen control device according to claim 3,
wherein the motor output setting unit,
when the screen is continuously driven downward from the uppermost position to the lowermost position,
linearly increases the motor output until the motor output reaches a predetermined upper limit output,
holds the upper limit output upon the motor output reaching the upper limit output,
starts a control of linearly decreasing the motor output upon the screen reaching the first intermediate position, and
drives the screen to the lowermost position by holding the limited output upon the screen reaching the second intermediate position.

7. The screen control device according claim 2, wherein the addable output is lower than the driving minimum output.

8. The screen control device according to claim 7,
wherein the motor output setting unit,
when the screen is continuously driven downward from the uppermost position to the lowermost position,
linearly increases the motor output until the motor output reaches a predetermined upper limit output,
holds the upper limit output upon the motor output reaching the upper limit output,
starts a control of linearly decreasing the motor output upon the screen reaching the first intermediate position, and
drives the screen to the lowermost position by holding the limited output upon the screen reaching the second intermediate position.

9. The screen control device according to claim 2,
wherein the motor output setting unit,
when the screen is continuously driven downward from the uppermost position to the lowermost position,
linearly increases the motor output until the motor output reaches a predetermined upper limit output,
holds the upper limit output upon the motor output reaching the upper limit output,
starts a control of linearly decreasing the motor output upon the screen reaching the first intermediate position, and
drives the screen to the lowermost position by holding the limited output upon the screen reaching the second intermediate position.

10. The screen control device according to claim 1, wherein the motor output setting unit detects the driving minimum output and stores it into the storage unit each time the screen is driven in the downward direction.

11. The screen control device according to claim 10, wherein the addable output is lower than the driving minimum output.

12. The screen control device according to claim 11,
wherein the motor output setting unit, when the screen is continuously driven downward from the uppermost position to the lowermost position, linearly increases the motor output until the motor output reaches a predetermined upper limit output, holds the upper limit output upon the motor output reaching the upper limit output, starts a control of linearly decreasing the motor output upon the screen reaching the first intermediate position, and drives the screen to the lowermost position by holding the limited output upon the screen reaching the second intermediate position.

13. The screen control device according to claim 10, wherein the motor output setting unit, when the screen is continuously driven downward from the uppermost position to the lowermost position, linearly increases the motor output until the motor output reaches a predetermined upper limit output, holds the upper limit output upon the motor output reaching the upper limit output, starts a control of linearly decreasing the motor output upon the screen reaching the first intermediate position, and drives the screen to the lowermost position by holding the limited output upon the screen reaching the second intermediate position.

14. The screen control device according to claim 1, wherein the addable output is lower than the driving minimum output.

15. The screen control device according to claim 14, wherein the motor output setting unit, when the screen is continuously driven downward from the uppermost position to the lowermost position, linearly increases the motor output until the motor output reaches a predetermined upper limit output, holds the upper limit output upon the motor output reaching the upper limit output, starts a control of linearly decreasing the motor output upon the screen reaching the first intermediate position, and drives the screen to the lowermost position by holding the limited output upon the screen reaching the second intermediate position.

16. The screen control device according to claim 1, wherein the motor output setting unit, when the screen is continuously driven downward from the uppermost position to the lowermost position, linearly increases the motor output until the motor output reaches a predetermined upper limit output, holds the upper limit output upon the motor output reaching the upper limit output, starts a control of linearly decreasing the motor output upon the screen reaching the first intermediate position, and drives the screen to the lowermost position by holding the limited output upon the screen reaching the second intermediate position.

\* \* \* \* \*